United States Patent

[11] 3,558,857

| [72] | Inventor | Warren L. Braun<br>Harrisonburg, Va. |
|---|---|---|
| [21] | Appl. No. | 784,740 |
| [22] | Filed | Dec. 18, 1968 |
| [45] | Patented | Jan. 26, 1971 |
| [73] | Assignee | Adamson Company<br>Richmond, Va.<br>a corporation of Ohio |

[54] TEMPERATURE CONTROL SYSTEM USING A NONREENTRANT TEMPERATURE-SENSITIVE BRIDGE TRANSDUCER
7 Claims, 10 Drawing Figs.

| [52] | U.S. Cl. | 219/499, 219/502 |
|---|---|---|
| [51] | Int. Cl. | H05b 1/02 |
| [50] | Field of Search | 219/499, 502; 317/42 |

[56] References Cited
UNITED STATES PATENTS
3,161,759  12/1964  Gambill et al. ............... 219/502X Primary Examiner—Bernard A. Gilheany
Assistant Examiner—F. E. Bell
Attorney—Sughrue, Rothwell, Mion, Zinn & MacPeak ABSTRACT: A Wheatstone bridge element including temperature-sensitive resistors is placed in or adjacent to a fluid which is to be temperature controlled and is energized at its input nodes. A diode and light source or a diode and an amplifier for driving a light source are connected across the output nodes of the bridge. A high-current triac is triggered by the charging of an RC circuit in which a resistive element is photocontrolled by the light source. Power control by the triac is used to control heating the fluid.

PATENTED JAN 26 1971
3,558,857
SHEET 1 OF 2
FIG.1
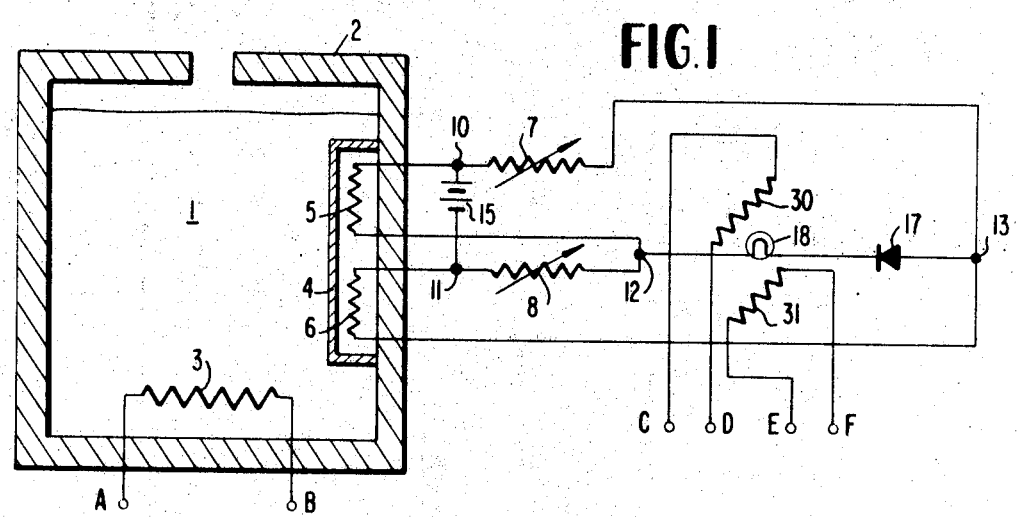
FIG.2
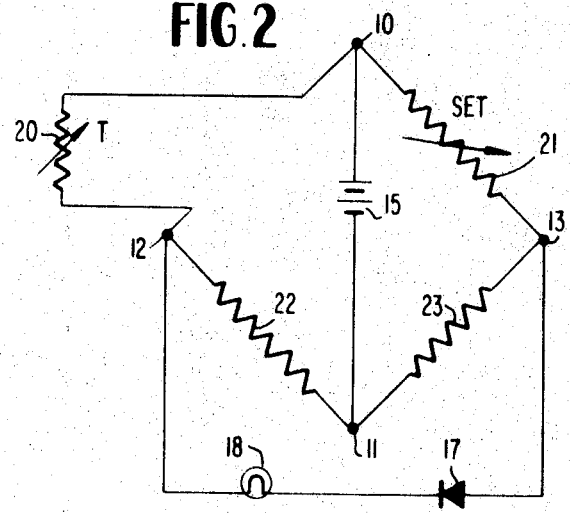
FIG.4A
FIG.4B
FIG.4C
FIG.4D
FIG.4E
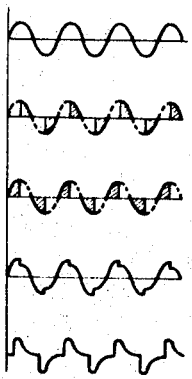
FIG.3
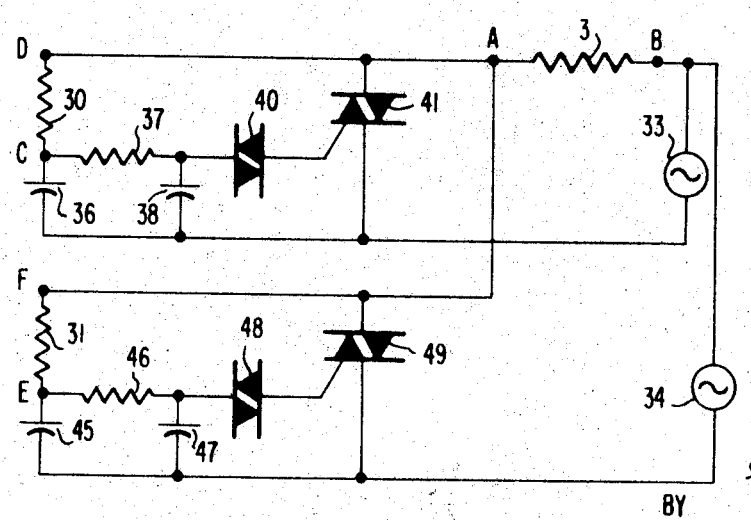
INVENTOR
WARREN L. BRAUN
BY Sughrue, Rothwell, Mion,
Zinn & Macpeak
ATTORNEYS

FROM BRIDGE AND AMPLIFIER HOUSING

INVENTOR
WARREN L. BRAUN

BY
ATTORNEYS 3,558,857

TEMPERATURE CONTROL SYSTEM USING A NONREENTRANT TEMPERATURE-SENSITIVE BRIDGE TRANSDUCER

BACKGROUND OF THE INVENTION

1. Field of the Invention

This invention relates to a control system for measuring and controlling the temperature of a fluid.

2. Description of the Prior Art

U.S. Pat. No. 2,761,052 (Knudsen) discloses a temperture-sensitive bridge used to control the temperature of an oil bath. A shutter is controlled by the bridge to vary the intensity of light which reaches a photoelectric tube. The tube controls the firing of a thyratron, thereby controlling energization of a heater for the oil bath. The Knudsen device is not solid state, but requires moving parts and thermionic elements.

U.S. Pat. No. 3,327,214 (Allen et al.) discloses (in FIG. 3) a bridge circuit including a diode and a meter across the output nodes of the bridge. Neither of the devices is capable of temperature measurement. Also neither of the devices is capable of providing an indication of the bridge condition which is electrically isolated from the bridge. Thus, even if such bridges were adaptable to temperature measurement, it would be difficult to use them to control multiphase power.

SUMMARY OF THE INVENTION

This invention is a solid-state for measuring the temperature of nodes; fluid and for controlling a heater element to maintain the temperature at a predetermined value. No moving parts are required. The control portion of the system can control a plurality of phases of electrical power separately with no electrical interconnection to the measuring portion of the system.

BRIEF DESCRIPTION OF THE DRAWINGS

FIG. 1 is a schematic diagram of that part of a first embodiment of the present invention which measures the temperature of the fluid.

FIG. 2 is a schematic diagram of an alternate form of measuring circuit for use in the embodiment of FIG. 1.

FIG. 3 is a schematic diagram of the control portion of the first embodiment.

FIGS. 4A through 4E illustrate waveforms associated with FIG. 3.

DESCRIPTION OF THE PREFERRED EMBODIMENTS

Figure 5:
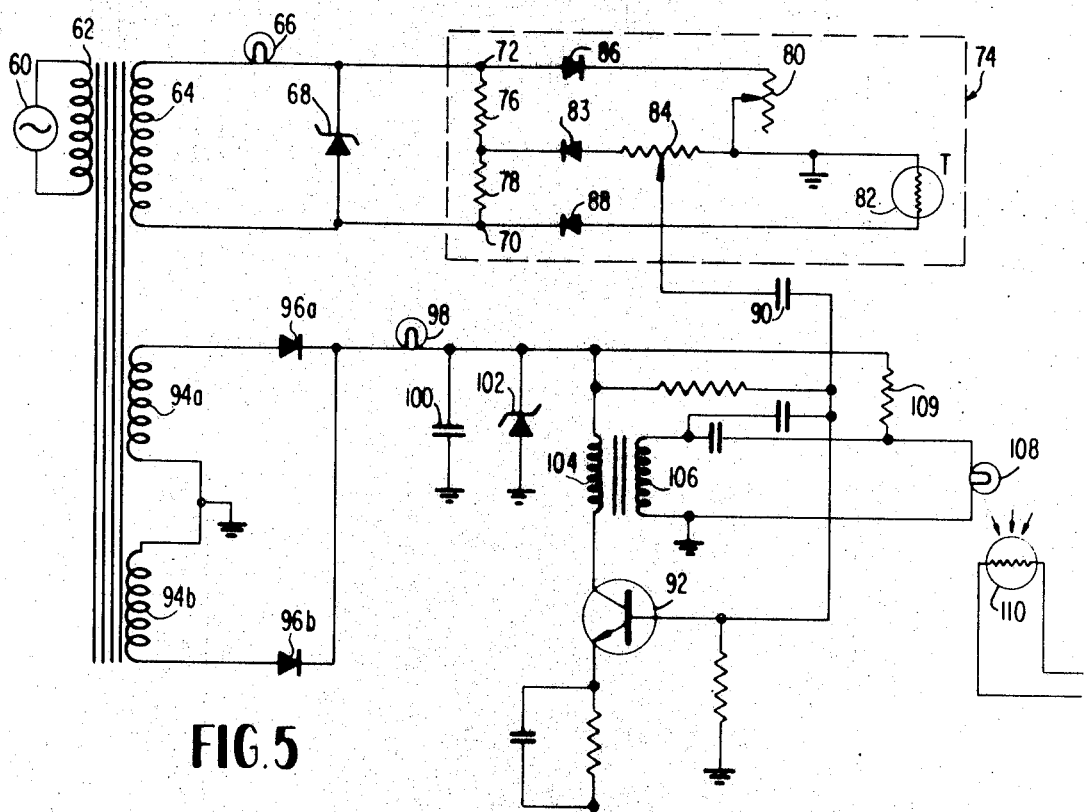
FIG. 5 is a schematic diagram of an alternative embodiment of the invention, designed to be operated by AC power.

FIG. 1 illustrates a system for measuring the temperature of a fluid 1 in a vessel 2. The fluid is heated by a resistive heater 3 energized by the application of electric power at terminals A and B. The invention includes a system for controlling the application of power to heater 3 to control the temperature of the fluid.

An enclosure 4 is provided, separated from the fluid but maintained, by thermal conduction, radiation, etc., at the same temperature as the fluid. In the enclosure are two thermally responsive resistors 5 and 6. The enclosure is not necessary if the resistors 5 and 6 are suitably encapsulated.

Resistors 5 and 6 are connected with variable resistors 7 and 8 to form a Wheatstone bridge. The bridge has two input nodes 10 and 11 and two output nodes 12 and 13. Around the bridge, in the order illustrated, are resistor 5, node 10, resistor 7, node 13, resistor 6, node 11, resistor 8, node 12 and back to resistor 5.

A bias source 15, illustrated as a battery, is connected across input nodes 10 and 11. A diode 17 and a light source 18 are connected in series between output nodes 12 and 13.

By adjusting variable resistors 7 and 8, one can both compensate for any variation of thermally responsive resistors from their standard value at a given temperature and adjust the bridge to be balanced for any given fluid temperature.

Diode 17 can be poled in either direction. Depending upon the polarity of the diode, bridge unbalance for either too high or too low temperature values will cause unbalance current to flow, thereby lighting the light source 18. Bridge unbalance in the other direction can cause no current to flow because the diode blocks such current. Because the bridge unbalance is indicated in only one direction, the bridge is called "nonreentrant."

In the preferred embodiment, the bridge is balanced at the desired temperature value and is nonreentrant for higher values of temperature. Only lower values of temperature will cause the light source to emit light. The amount of current flowing through the light source, and hence the amount of light emitted, can be either proportional to or some function of the difference between the desired temperature and the lower actual temperature.

As will become apparent, in an embodiment of the invention for cooling a fluid, the diode would be reversed.

An amplifier could replace the light source and be used to drive a light source if higher power were desired. However, in this embodiment, it is preferable to use a large enough power source 15 so that no amplifier is required.

Although the bridge is illustrated in FIG. 1 as having two temperture-sensitive resistors 5 and 6, a bridge as illustrated in FIG. 2 having only temperature-sensitive resistor could also be used.

The bridge of FIG. 2 has the same elements as that of FIG. 1 with the exception that resistor 20 is the only temperature-sensitive resistor. REsistor 21 is variable to set the balance point of the bridge. Resistors 22 and 23 are conventional.

Referring again to FIG. 1, two photosensitive resistors 30 and 31 are shown placed adjacent to light source 18 to be irradiated by light emitted from source 18. Leads from resistor 30 extend to terminals C and D and leads from resistor 31 extend to terminals E and F. Of course, more than two photosensitive resistors could be placed to be irradiated by source 18.

FIG. 3 illustrates a control circuit using the variations in the resistance of photosensitive resistors 30 and 31 to control the two-phase electrical power energizing heater element 3. Two phases are shown for convenience only. The system could be used for one-phase power, three-phase power, etc.

Two phases of electrical power are provided by two power sources 33 and 34. The connection to the secondary of a two-phase transformer to achieve these power sources is well known. If an AC power source provides an excessively large voltage, the power source may be modified to include a voltage divider, allowing the use of less expensive lower rated elements in subsequent positions.

Capacitor 36 is driven by source 33 through the series combination of heater resistor 3 and photosensitive resistor 30. The heater resistance is substantially constant and normally much smaller than photosensitive resistance 30.

The amount of time required for capacitor 36 to charge through resistors 3 and 30 is thus a function of the amount of light emitted by light source 18.

A bright light emitted by source 18 indicates a great bridge imbalance caused by a great difference between desired and actual fluid temperatures. Such a bright light causes the capacitor 36 to charge to any given voltage at an earlier phase angle, resulting from the greater ease with which current passes resistor 30.

Resistor 37 and capacitor 38 are additional filtering elements. The phase angle at which capacitor 38 is charged to a given voltage is also a function of the amount of light emitted by source 18. The greater the light, the earlier capacitor 38 reaches a given voltage.

Element 40 is a diac, a well known device which is also called a bilateral multilayer firing diode. When the terminal voltage of diac 40 reaches an inherently predetermined value, the diac become becomes conductive or "fires." The instant at which diac 40 fires is determined by the phase angle at which capacitor 38 becomes sufficiently charged.

When diac 40 fires, it discharges capacitor 38 while emitting a pulse which triggers triac 41. A triac is a high-power, selective gate, bidirectional, semiconductor triode thyristor, well known in the semiconductor art. When a triac is triggered at any time during a cycle, it becomes conductive, remains conductive until the end of the half-cycle, then becomes nonconductive until triggered again.

When the triac fires, it passes current to heater 3 for the remainder of the half-cycle, then stops passing current until retriggered. Thus, the amount of current reaching the heater varies according to the phase at which the triac is fired.

The lower the temperature of the fluid, the greater the unbalance of the bridge. A greater unbalance causes light source 18 to emit more light, lowering the resistance of photosensitive resistor 30. This causes capacitor 38 to reach the firing voltage of diac 40 earlier in phase, thereby firing triac 41 earlier in phase, and thereby supplying more heater current to raise the temperature.

RC resistor 31 controls comprising; from source 34 via control elements 45 through 49 in a similar manner.

FIGS. 4A through 4E illustrate waveforms associated with only one phase of the device in FIG. 3. FIG. 4A is the supply voltage waveform measured across source 33. FIG. 4B is the load voltage waveform measured across heater 3. FIG. 4C is the triac voltage waveform measured across triac 41. FIG. 4D is the capacitor voltage measured across capacitor 38. FIG. 4E is the pulse output voltage from diac 40.

FIG. 5 is a schematic diagram of an alternative embodiment of the invention, designed to be operated by AC power.

An AC power source 60 provides line voltage to a transformer primary 62. Power is coupled through a secondary 64 and a ballast lamp 66 and is converted to pulsating AC power by a Zener diode 68. This power is applied across the input terminals 70 and 72 of a bridge 74. Resistors 76 and 78, potentiometer 80 and thermistor 82 form the resistive legs of the bridge. Diode 83 and potentiometer 84 are connected across the output of the bridge. Additional diodes 86 and 88 are used in the bridge to allow operation on either AC or DC input power.

The bridge output is taken from potentiometer 84 through AC coupling capacitor 90 to the control terminal of a grounded emitter, AC amplifier transistor.

Power for the operation of the AC amplifier circuit is furnished by an additional transformer secondary arrangement 94a and 94b, through rectifiers 96a and 96b to provide a full-wave rectified AC signal at a ballast lamp 98. This lamp, like lamp 66, serves as a regulator, indicator and fuse. The ballast output is smoothed by capacitor 100, regulated by zener diode 102, and applied to the amplifier circuit across the primary 104 of a stepdown impedance matching transformer and the transistor amplifier 92. The amplifier signal is coupled to transformer secondary 106 to be applied to a lamp 108. Resistor 109 applies a bias to lamp 108 to prewarm the lamp, thereby improving the current or brightness curve of the lamp. One or more photocontrolled resistors 110 are controlled by the lamp, thereby being responsive to the bridge output.

Figure 6:
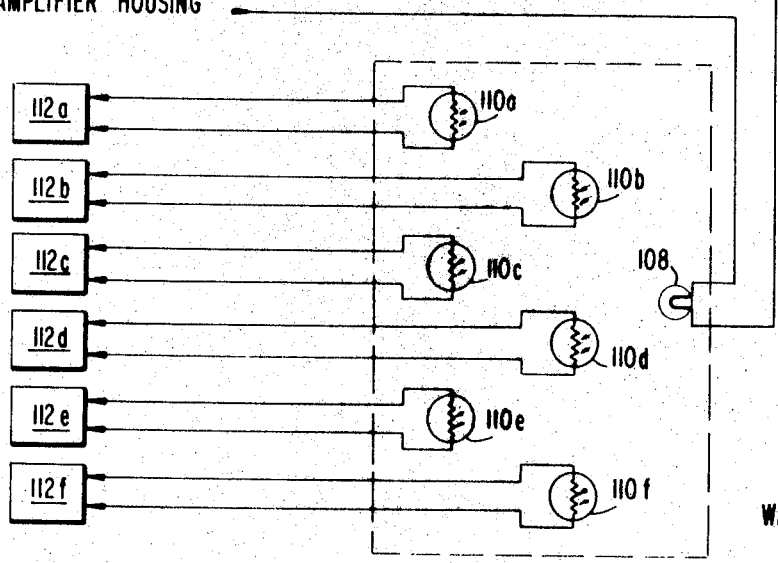
FIG. 6 is a schematic diagram of a photoconductor arrangement for use in the invention.

FIG. 6 shows a single light source 108 used to control six photocontrolled resistors 110a—110f, thereby controlling six independent power control circuits 112a—112f.

The temperature control system disclosed herein is not limited to the control of fluids which are electrically heated. The system is adaptable to the control of a valve which admits steam to heat a tank of water, for example.

While the invention has been particularly shown and described with reference to preferred embodiments thereof, it will be understood by those skilled in the art that various changes in form and details may be made therein without departing from the spirit and scope of the invention.

I claim:
1. A temperature measuring device comprising:
   a. a Wheatstone bridge further comprising;
      1. two input nodes,
      2. two output nodes, and
      3. for four impedance legs each connected between a different pair of one input and one output and one output node,
   b. at least one of a said impedance legs including an element having an impedance which varies significantly as a function of the temperature of the element;
   c. means for applying electrical power to said input nodes, and
   d. a series-connected diode and light source directly connected between the output nodes of said bridge, said diode being in a conducting state when said bridge is unbalanced in one direction and in a nonconducting state when said bridge is unbalanced in the other direction, whereby said light source means emits light as a function of the degree of unbalance of said bridge in one direction and emits no light when the bridge is unbalanced in the other direction.

2. A device according to claim 1 wherein said electrical power is AC power.

3. A temperature control system including a temperature measuring device according to claim 1 for measuring the temperature of a fluid and further comprising:
   a. an RC circuit further comprising;
      1. a photosensitive resistor situated to be irradiated by light emitted by said light source means, and
      2. a capacitor adapted to be charged through said photosensitive resistor at a rate controlled by the amount of light irradiated onto said photosensitive resistor,
   b. output means for changing the temperature of said fluid;
   c. supply means for supplying energy for operating said output means; and
   d. control means responsive to the charge on said capacitor for controlling the rate of energy transfer from said supply means to said output means.

4. A temperature control system according to claim 3 wherein:
   a. said output means comprises an AC electrically operated heater element;
   b. said supply means comprises a source of a AC voltage and AC current; and
   c. said control means comprises:
      1. means responsive to the presence of a predetermined voltage on said capacitor for discharging said capacitor and for producing an output pulse, and
      2. means connected between said supply means and said output means for receiving each half-cycle of said AC voltage, for blocking passage of said AC current from the beginning of said half-cycle until the occurrence of said output pulse, and for passing said AC current from the occurrence of said output pulse until the end of said half-cycle,
   whereby the amount of energy reaching said output means varies as a function of the relative phase difference between said pulse and said beginning of said half-cycle.

5. A temperature control system according to claim 4 further comprising:
   a. an additional supply means for supplying a different phase of AC voltage and current to said output means;
   b. and additional RC circuit comprising;
      1. an additional photosensitive resistor situated to be irradiated by light emitted by said light source, and
      2. and an additional capacitor adapted to be charged through said additional photosensitive resistor at a rate controlled by the amount of light irradiated onto said additional photosensitive resistor, and
   c. an additional control means responsive to the charge on said capacitor for controlling the rate of energy transfer from said additional supply means to said output means.

6. A temperature measuring device comprising:
   a. a Wheatstone bridge comprising;
      1. two input nodes,
      2. two output nodes, and 3. four impedance legs, each connected between a different pair of one input and one output node,
b. at least one of said impedance legs including an element having an impedance which varies as a function of the temperature of the element;
c. means for applying electrical power to said input nodes;
d. a series-connected diode and variable resistance means directly connected across said output nodes;
e. a transistor amplifier including a control conductor and at least one signal conductor, said control conductor connected to an output terminal of said variable resistance means; and
f. a light source connected to said signal conductor.

7. A device as in claim 6 further including, a bias means coupled to said light source for prewarming said lamp.